United States Patent
Wei

(10) Patent No.: US 10,180,555 B2
(45) Date of Patent: Jan. 15, 2019

(54) SHADE AND CAMERA MODULE HAVING SAME

(71) Applicant: Chuandong Wei, Shenzhen (CN)

(72) Inventor: Chuandong Wei, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 196 days.

(21) Appl. No.: 15/358,505

(22) Filed: Nov. 22, 2016

(65) Prior Publication Data

US 2018/0024309 A1 Jan. 25, 2018

(30) Foreign Application Priority Data

Jul. 20, 2016 (CN) ..................... 2016 2 0761480 U

(51) Int. Cl.
*G02B 7/02* (2006.01)
*G02B 27/00* (2006.01)
*G02B 5/00* (2006.01)

(52) U.S. Cl.
CPC ............. *G02B 7/021* (2013.01); *G02B 7/022* (2013.01); *G02B 27/0018* (2013.01); *G02B 5/005* (2013.01)

(58) Field of Classification Search
CPC ........ G02B 7/021; G02B 5/005; G02B 7/022; G03B 9/02
USPC ......................................................... 359/740
See application file for complete search history.

(56) References Cited

U.S. PATENT DOCUMENTS

2006/0291076 A1\* 12/2006 Watanabe .............. G02B 7/025
359/811

\* cited by examiner

*Primary Examiner* — Wen Huang
(74) *Attorney, Agent, or Firm* — Na Xu; IPro, PLLC

(57) ABSTRACT

A shade for a camera module is disclosed. The shade includes an optical aperture; a deformed portion extending outward from a wall of the optical aperture; and a fixed portion extending outward from the deformed portion. The deformed portion includes a body and a plurality of notches communicating with the optical aperture, and the notches pass through an upper surface and a lower surface of the shade.

8 Claims, 5 Drawing Sheets

SHADE AND CAMERA MODULE HAVING SAME

FIELD OF THE INVENTION

The present disclosure relates to a shade and a camera module provided with this shade.

DESCRIPTION OF RELATED ART

With progressive development of technology, electronic devices are developed constantly toward intelligent types. In addition to digital camera, portable electronic devices such as iPad, mobile phone and so on are also equipped with camera modules, to meet the higher requirements of people on the object image quality taken by the camera module. The image quality of the object taken by the camera is related to stray light in a certain extent.

The camera module with related technologies includes a lens barrel equipped with optical aperture and a lens group located inside the lens barrel. The lens group includes at least two lenses and a shade installed between the first lens and the second lens. The shade is used for blocking excessive light to prevent stray light and not to affect imaging effect. But in the process of manufacturing, as the shade is very thin and the material is very soft, the shade is easy to be deformed or is offset from the expected assembling position, unable to reach ideal shading effect.

Therefore, it is necessary to provide an improved shade to overcome above disadvantage.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

FIG. 1b is an enlarged view of Part A in FIG. 1a.

FIG. 1c is an exploded view of a shade assembly in FIG. 1a.

FIG. 2 is an illustration of a first lens in FIG. 1a.

FIG. 3 is an illustration of a second lens in FIG. 1a.

FIG. 4 is a front view of a first shade in FIG. 1a.

FIG. 5 is a front view of a second shade in FIG. 1a.

FIG. 7b is an enlarged view of Part A' in FIG. 7a.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain this disclosure, not intended to limit this disclosure.

Figure 1A:
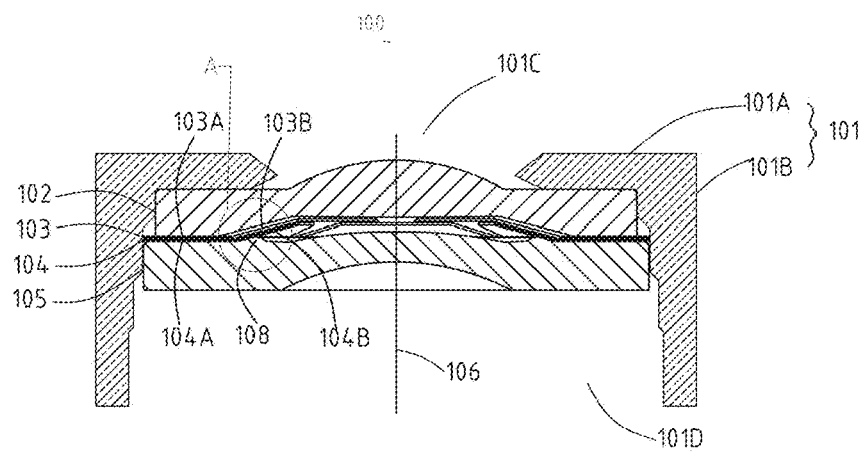
FIG. 1a is an illustration of a camera module in accordance with a first embodiment (Embodiment 1) of the present disclosure.

Embodiment 1:

As shown in FIG. 1a, a camera module 100 includes a lens barrel 101 and a lens group installed in the lens barrel 101 and contacted the lens barrel 101. The lens barrel 101 comprises a first barrel wall 101A with an optical aperture 101C, a second barrel wall 101B extended un-straightly from the first barrel wall 101A, and an accommodation space 101D formed by the first barrel wall 101A and the second barrel wall 101D. The lens group includes a first lens 102, a first shade 103, a second shade 104 and a second lens 105, which are stacked in turn from the object side to the image side. The first lens 102, the first shade 103, the second shape 104 and the second lens 105 are distributed along axis of the lens barrel 101.

Figure 2:
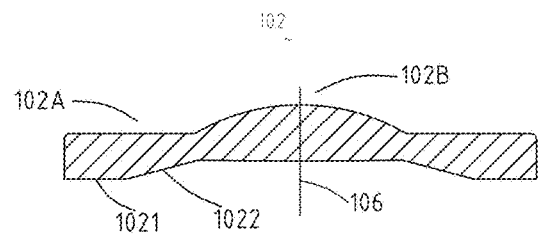

As shown in FIG. 2, the first lens 102 includes an optical imaging portion 102B close to the optical axis and a peripheral portion 102A arranged around the optical imaging portion 102B. The peripheral portion 102A comprises, in turn along the edge of the first lens 102 toward its optical axis, a first plane 1021 and a first slope 1022 which slopes and extends un-straightly from the first plane 1021 to the object side.

Figure 3:
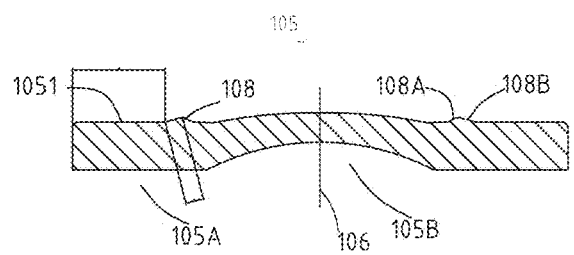

As shown in FIG. 3, the second lens 105 includes an optical imaging portion 105B close to the optical axis 106 and a peripheral portion 105A arranged around the optical imaging portion 105B. The peripheral portion 105A comprises, in turn along the edge of the second lens 105 toward its optical axis, a second plane 1051, a lug 108 raised from the second plane 1051 to the object side.

In this embodiment, the lug 108 includes a second slope 108B contacted the second plane 1051 and a third slope 108A close to the optical imaging portion 105B of the second lens 105. In other embodiments, the lug can be other shapes, for example, circular arc, square, etc.

The horizontal distance from the bottom of the lug 108 to the edge of the second lens 105 is d2. The slope length from the bottom of the lug 108 to top of the lug is d4.

Figure 4:
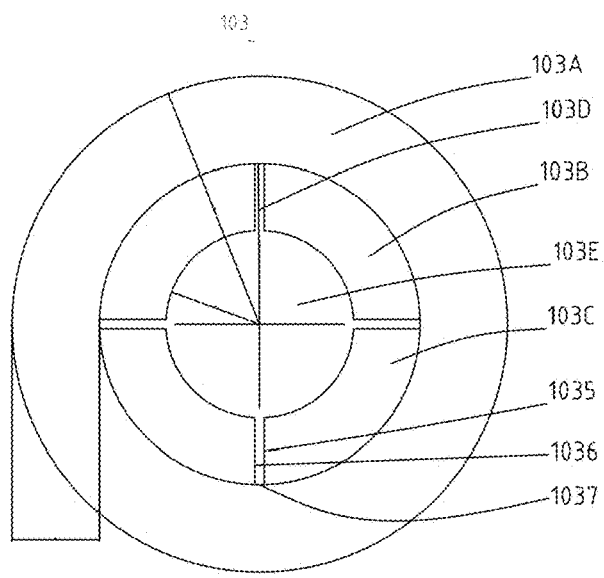

As shown in FIG. 4, the first shade 103, with external diameter R2, includes an optical aperture 103E, a first deformed portion 103B extended outward from the wall of the first optical aperture 103E, a first fixed portion 103A extended outward from the first deformed portion 103B. The aperture diameter of the first optical aperture 103E is R1. The first deformed portion 103B includes a first body 103C and several first notches 103D connected with the first optical aperture 103E. The first notches 103D pass through the upper and lower surfaces of the first shade 103. The first notches 103D have a third cutting surface 1035, a fourth cutting surface 1036 separated opposite to the third cutting surface 1035 and a first connecting surface 1037 connecting the third cutting surface 1035 and the fourth cutting surface 1036. The radius of the circle where the first connecting surface 1037 located is R3. The shortest distance from the first connecting surface 1037 to the most outer edge of the first shade 103 is d1. A second angle θ2 is formed between the third cutting surface 1035 and the fourth cutting surface 1036.

In this embodiment, θ2=0, the effective shading area of the first shade 103 can be maximized, reinforcing the shading effect. In other embodiments, according to the actual need, θ2 may also be other angles, and meet the condition $0° \leq \theta 2 < 180°$.

In this embodiment, there are four first notches 103D, which are arranged symmetrically. In other embodiments, the first notches can be other quantity, and meet the condition $N \geq 2$.

In this embodiment, the first connecting surface 1037 is cylinder surface section which is coaxial to the first optical aperture 103E, its radius is R3; R1 <R3 <R2. In other embodiments, the first connecting surface can also be changed to other shapes according to the actual need, such as a flat surface etc.

The first deformed portion 103B can be bent by force toward the upper surface or the lower surface.

Figure 5:
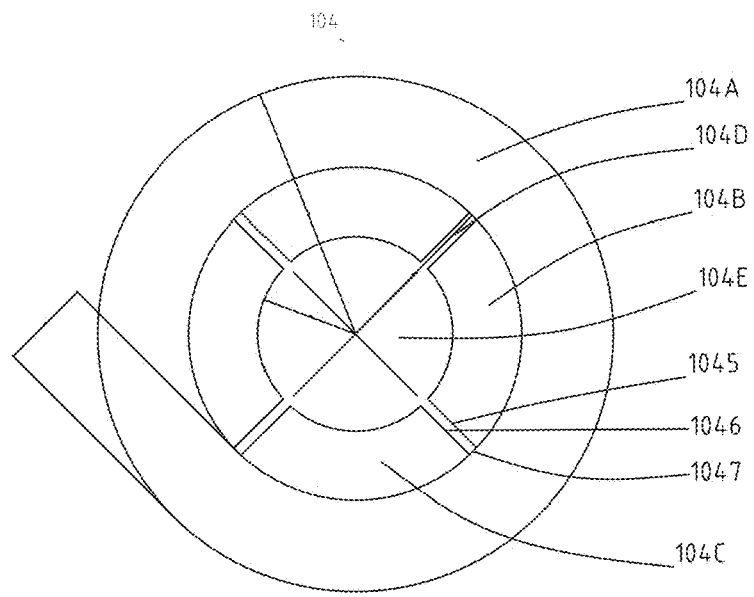

As shown in FIG. 5, the second shade 104, with external diameter of R5, includes an optical aperture 104E, a second deformed portion 104B extended outward from the wall of the second optical aperture 104E, and a second fixed portion 104A extended outward from the second deformed portion 104B. The aperture diameter of the second optical aperture 104E is R4. The second deformed portion 104B includes a second body 104C and several second notches 104D connecting with the second optical aperture 104E. The second notches 104D pass through the upper and lower surfaces of the second shade 104. The second notches 104D have a fifth cutting surface 1045, a sixth cutting surface 1046 separated opposite to the fifth cutting surface 1045 and a second connecting surface 1047 connecting the fifth cutting surface 1045 and the sixth cutting surface 1046. The radius of the circle where the second connecting surface 1047 located is R6. The shortest distance from the second connecting surface 1047 to the outer most edge of the second shade 104 is d3. A third angle θ3 is formed between the fifth cutting surface 1045 and the sixth cutting surface 1046.

In this embodiment, θ3=0, the effective shading area of the second shade 104 can be maximized, reinforcing the shading effect. In other embodiments, θ3 may also be other angles according to the actual need, and meet the condition 0°≤θ3<180°.

In this embodiment, there are four second notches 104D, which are arranged symmetrically. In other embodiments, the second notch can be other quantity, and meet the condition N≥2.

In this embodiment, the second connecting surface 1047 is cylinder surface section which is coaxial to the second optical aperture 104E, its radius is R6; R4<R6<R5. In other embodiments, the first connecting surface can also be changed to other shapes according to the actual need, such as a flat surface etc.

The second deformed portion 104B can be bent by force toward the upper surface or the lower surface.

Figure 1B:
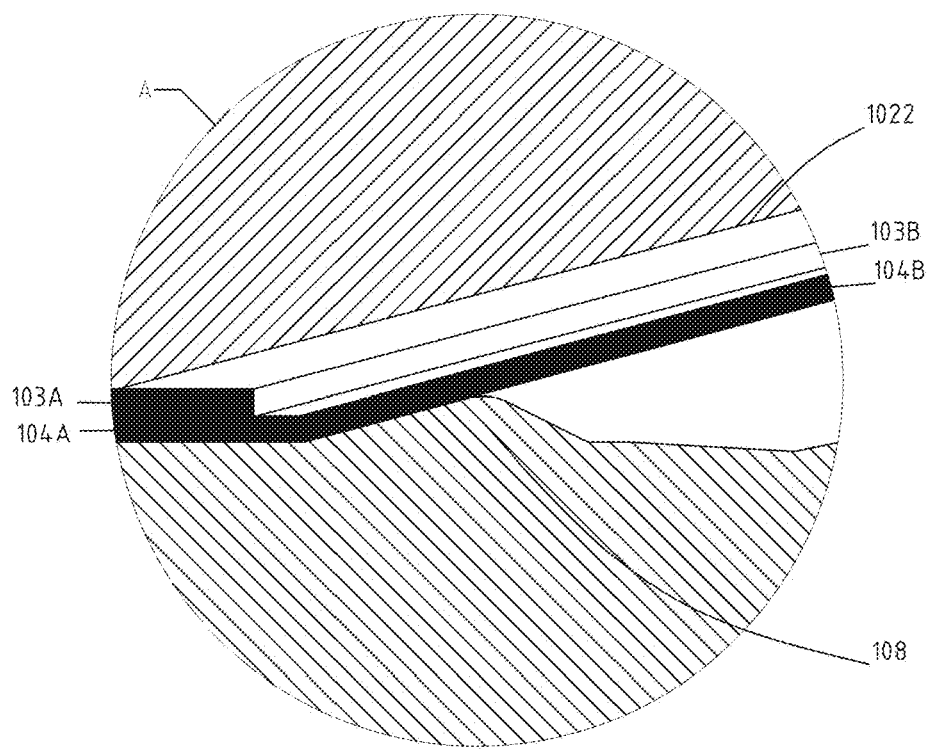
Figure 1C:
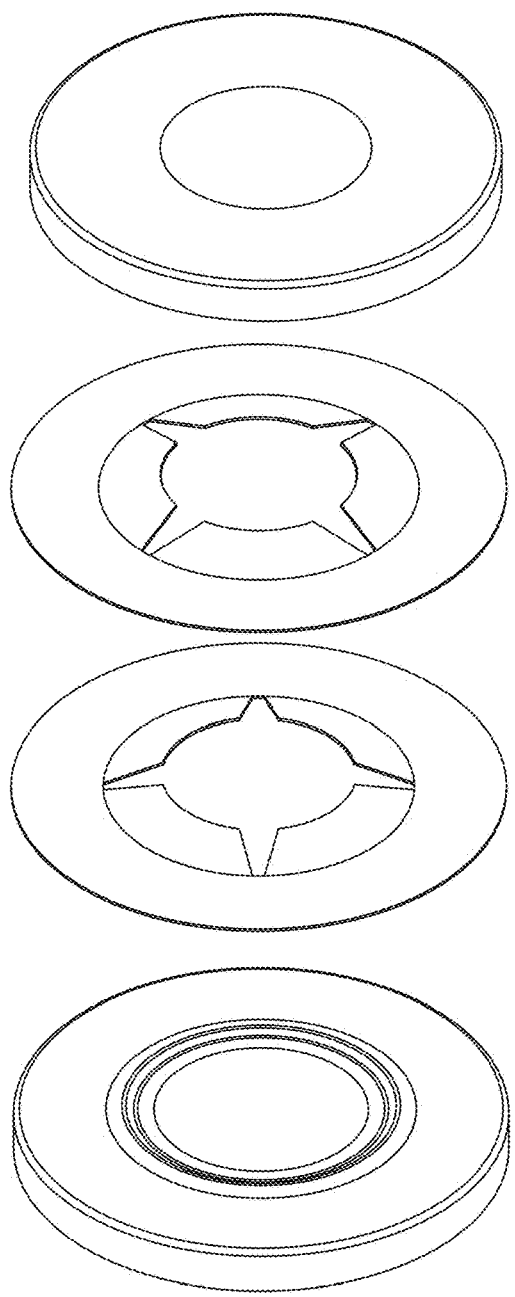

As shown in FIG. 1c, the second shade 104 and the first shade 103 are staggered by 45°. The projection of the first notches 103D in direction of optical axis are located on the second body 104C, and the projection of the second notches 104D in direction of optical axis are located on the first body 103C, which can ensure that the camera doesn't leak light, preventing and reducing stray light.

In other embodiments, the installation angle of the first shade and the second shade can vary according to actual needs and different shade structure.

As shown in FIG. 1a and FIG. 1b, the first fixed portion 103A of the first shade 103 and the second fixed portion 104A of the second shade 104 are fixed and clamped by the first plane 1021 and the second plane 1051. The second deformed portion 104b of the second shade 104 is bent toward the object side under the force of the lug 108 and attached to the first slope 1022. The second body 104C and the second slope 108B of the lug 108 are attached. The first deformed portion 103B of the first shade 103 is also bent naturally toward the object side. The first body 103C is attached tightly to the first slope 1022. In such a structure, the peripheral portion of the lower surface of the first lens 102 is completely covered. The peripheral portion 102A of the first lens 102 forms a shading structure with the first shade 103, the second shade 104, the peripheral portion 105A of the second lens 105, which can ensure that the lens doesn't leak light, preventing and reducing stray light. The first slope can be free of light extinction, reducing the cost and upgrading the imaging effect.

In this embodiment, the shading structure includes two shades, which can realize no light leakage. In other embodiments, according to the different shade structure and actual need, the number of shades can also be increased, ensuring the shading effect.

In this embodiment, the external diameter of the second lens 105 is same as the external diameter of the shade, in order that the deformed portion of the shade can be bent effectively, also meet the condition d1<d2+d4, d3<d2+4. In other embodiments, it is only ensured the connecting surface is at the side of the lug away from the optical axis.

In this embodiment, the lug 108 is installed on the upper surface of the second lens 105. The lug 108 give force to the second shade 104 and the second shade 104 is bent toward the object side. In other embodiments, the lug can also be installed on the lower surface of the first lens and give force to the first shade, then the first shade is bent toward the image side.

In this embodiment, there are only two lenses. In other embodiments, at least a third lens is added. Two similar shades are installed between the third lens and the second lens, forming a shading structure similar to the structure described above to block stray light.

Figure 6:
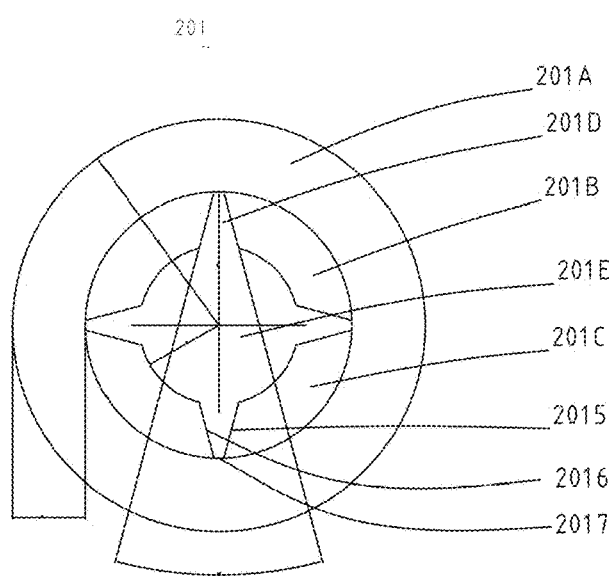
FIG. 6 is a front view of a shade of another embodiment.

In other embodiments, the first shade and the second shade can be other structures. As shown in FIG. 6, the shade 201, with external diameter of R2', is provided with an optical aperture 201E, a deformed portion 201B extended outward from the wall of the optical aperture 201E, and a fixed portion 201A extended outward from the deformed portion 201B. The aperture diameter of the optical aperture 201E is R1'. The deformed portion 201B includes a body 201C and several notches 201D which are connected to the optical aperture 201E. The notches 201D pass through the upper and lower surfaces of the shade 201.

The notches 201D have a first cutting surface 2015, and a second cutting surface 2016 separated opposite to the first cutting surface 2015, and a connecting surface 2017 which connects the first cutting surface 2015 and the second cutting surface 2016. The radius of the circle where the connecting surface 2017 located is R3'. The shortest distance from the connecting surface 2017 to the most outer edge of the shade 201 is d1'. A first angle θ1 is formed between the first cutting surface 2015 and the second cutting surface 2016.

In this embodiment, θ1≠0, the rate of finished shades in production can be improved and the production costs can be reduced. In other embodiments, according to the actual need, θ2 may also be other angles, and meet the condition 0°≤θ2<180°.

In this embodiment, there are four notches 201D, which are arranged symmetrically. In other embodiments, the notches can be other quantity, and meet the condition N≥2.

In this embodiment, the connecting surface 2017 is cylinder surface section which is coaxial to the optical aperture 201E, Radius is R3'; R1'<R3'<R2'. In other embodiments, the first connecting surface can also be changed to other shapes according to the actual need, such as a flat surface etc.

The deformed portion 201B can be bent by force toward the upper surface or the lower surface.

In actual application on camera, in order to realize no light leakage, the length of d1' and the angle of the first angle θ1 can be adjusted and several lenses are staggered etc.

Figure 7A:
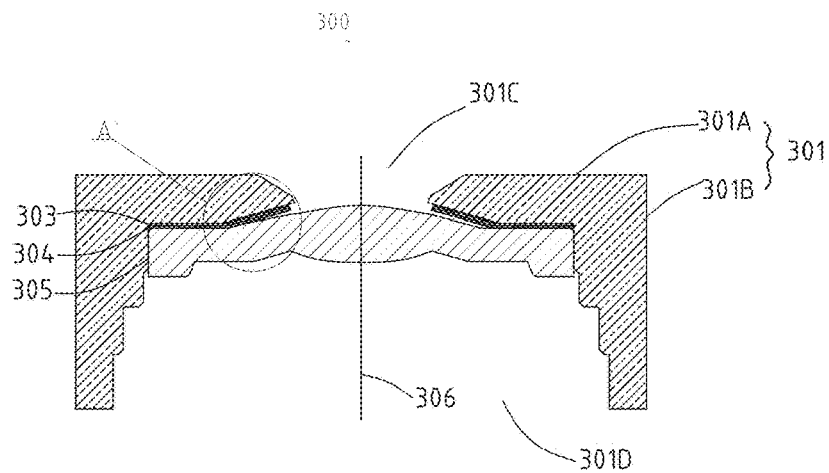
FIG. 7a is an illustration of a camera module in accordance with a second embodiment (Embodiment 2) of the present disclosure.
Figure 7B:
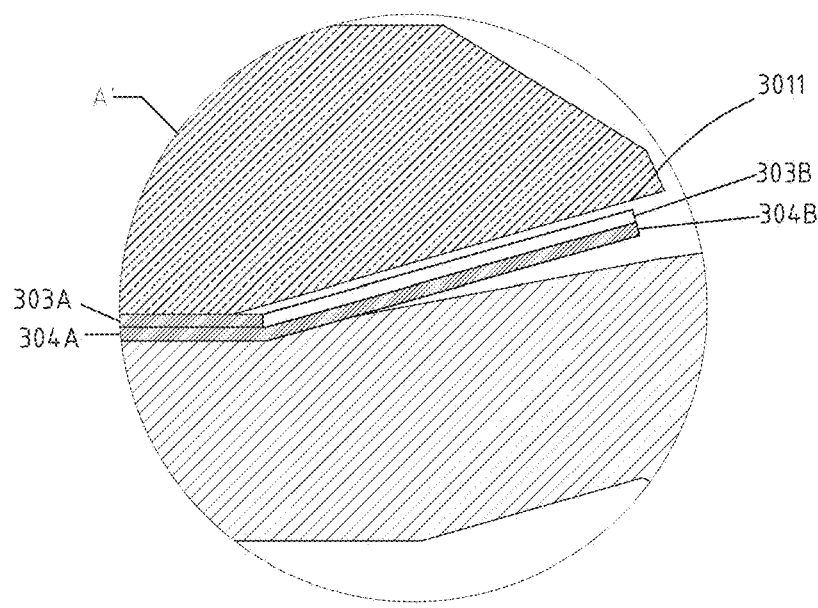

Embodiment 2:

As shown in FIGS. 7a-7b, the difference between this embodiment and embodiment 1 only lies in the fact that the peripheral portion of camera module 300's the first barrel wall 301A, the first shade 303, the second shade 304, the second lens 305 form a shading structure in this embodiment. The first body 303B of the first shade 303 is attached tightly to the fourth slope 3011 of the first barrel wall 301A.

In this embodiment, there is only one lens. In other embodiments, at least one third lens is added. Two similar shades are installed between the third lens and the second lens, forming a shading structure similar to the structure described above to block stray light.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera module including:
   a lens barrel having a first barrel wall forming an optical aperture, a second barrel wall extending perpendicularly from the first barrel wall, and an accommodation space formed by the first barrel wall and the second barrel wall;
   a lens group installed inside the lens barrel and connected to the lens barrel, the lens group including an optical axis, and including:
   a first shade having, in an order from an object side to an image side:
   a first optical aperture;
   a deformed part extending outwardly from a boundary wall of the first optical aperture, the first deformed part including a first body and a plurality of first notches communicated with the first optical aperture and passing through an upper and a lower surfaces of the first shade;
   a first fixed portion extending outwardly from and non-coplanar with the first deformed part;
   a second shade having:
   a second optical aperture;
   a second deformed part extending from a boundary wall of the second optical aperture, the second deformed part including a second body and a plurality of second notches communicated with the second optical aperture and passing through an upper and a lower surfaces of the second shade;
   a second fixed portion extended outwardly from and non-coplanar with the second deformed part;
   a second lens including:
   a second optical imaging portion;
   a second peripheral portion arranged around the optical imaging portion;
   wherein
   a projection of the first notch along the optical axis is located on the second body;
   a projection of the second notch along the optical axis is located on the first body.

2. The camera module as described in claim 1, wherein the first barrel wall and the first shade, the second shade, and the second lens cooperatively form a shading structure.

3. The camera module as described in claim 1 further including a first lens arranged between the first barrel wall and the first shade, wherein the first lens includes a first optical imaging portion and a first peripheral portion arranged around the first optical imaging portion, and the first peripheral portion of the first lens, the first shade, the second shade, the second peripheral portion of the second lens cooperatively form a shading structure.

4. The camera module as described in claim 2, wherein the second peripheral portion of the second lens is provided with a second lug attached to the second body and raising toward the first barrel wall.

5. The camera module as described in claim 3, wherein the first peripheral portion of the first lens is provided with a first lug attached to the first body and raising toward the second lens.

6. The camera module as described in claim 1, wherein the first notch have a third cutting surface, a fourth cutting surface separated opposite to the third cutting surface and a first connecting surface connecting the third cutting surface and the fourth cutting surface; a second angle θ2 is formed between the third cutting surface and the fourth cutting surface, and the second angle meets the condition $0° \leq θ2 < 180°$.

7. The camera module as described in claim 6, wherein the second notches have a fifth cutting surface, a sixth cutting surface separated opposite to the fifth cutting surface and a second connecting surface connecting the fifth cutting surface and the sixth cutting surface; a third angle θ3 is formed between the fifth cutting surface and the sixth cutting surface, and the third angle meets the condition $0° \leq θ3 < 180°$.

8. The camera module as described in claim 1, wherein the lens group comprises further at least a third lens located under the second lens; and the second lens and the adjacent third lens form a shading structure.

* * * * *